US009602617B1

(12) United States Patent
Duan et al.

(10) Patent No.: US 9,602,617 B1
(45) Date of Patent: Mar. 21, 2017

(54) HIGH PERFORMANCE AND SCALABLE TELEMATICS MESSAGE DISPATCHING

(71) Applicant: International Business Machines Corporation, Armonk, NY (US)

(72) Inventors: Ning Duan, Beijing (CN); Peng Gao, Beijing (CN); Guoqiang Hu, Shanghai (CN); Zhi Hu Wang, Beijing (CN); Xin Zhang, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/971,306

(22) Filed: Dec. 16, 2015

(51) Int. Cl.
G06F 15/16 (2006.01)
H04L 29/08 (2006.01)
H04L 12/58 (2006.01)

(52) U.S. Cl.
CPC .......... *H04L 67/2842* (2013.01); *H04L 51/04* (2013.01); *H04L 67/12* (2013.01); *H04L 67/18* (2013.01)

(58) Field of Classification Search
CPC ..... H04L 67/2842; H04L 67/12; H04L 67/18; H04L 51/04
See application file for complete search history.

(56) References Cited

U.S. PATENT DOCUMENTS

| 6,895,329 | B1 * | 5/2005 | Wolfson | G01C 21/3415 340/988 |
| 7,299,126 | B2 * | 11/2007 | Gedik | G06F 17/30333 342/357.62 |
| 8,352,635 | B2 | 1/2013 | Fein et al. | |
| 8,620,532 | B2 * | 12/2013 | Curtis | G06Q 30/0282 370/401 |
| 8,825,847 | B1 * | 9/2014 | Teller | H04W 4/04 455/431 |
| 2001/0047241 | A1 * | 11/2001 | Khavakh | G01C 21/34 701/410 |

(Continued)

FOREIGN PATENT DOCUMENTS

WO 2014/047182 A2 3/2014

OTHER PUBLICATIONS

Konstantinidis, A., "Adding Location to a High Performance", Msc in Computing Science Individual Project Report, Sep. 2008, Imperial College, London, 107 pages.

(Continued)

*Primary Examiner* — June Sison
(74) *Attorney, Agent, or Firm* — Scott, Scully, Murphy & Presser, P.C.; Kevin J. Jordan

(57) ABSTRACT

Dispatching messages in a moving object, in one aspect, may include receiving a description of a spatial area. A hierarchical tree representation of the spatial area may be generated. The hierarchical tree representation may comprise nodes, wherein a child node represents a sub-region of a region represented by a parent node of the child node. Moving features may be associated with each of the nodes, the moving features comprising whether the node is cacheable, whether the node covers an unpartitioned area, an active object list in an area covered by the node, and a latest position associated with an object in the active object list. Data from the moving object may be dispatched based on the hierarchical tree representation.

20 Claims, 7 Drawing Sheets

(56) References Cited

U.S. PATENT DOCUMENTS

| | | |
|---|---|---|
| 2005/0023524 A1 | 2/2005 | Beatty |
| 2005/0193146 A1 | 9/2005 | Goddard |
| 2005/0231425 A1* | 10/2005 | Coleman ............... G01C 21/206 342/385 |
| 2008/0139114 A1* | 6/2008 | Ranganathan ......... H04B 17/27 455/41.1 |
| 2011/0136503 A1* | 6/2011 | Sridhara ................ H04H 60/49 455/456.1 |
| 2011/0167073 A1* | 7/2011 | Rosenberg ........ G06F 17/30548 707/752 |
| 2012/0041672 A1* | 2/2012 | Curtis .................... H04H 20/57 701/426 |

OTHER PUBLICATIONS

Zhang, X., et al., "Scalable Mobile Data Streaming with Trajectory Preserving Partitioning", Published in: Mobile Services (MS), 2014 IEEE International Conference, Date of Conference: Jun. 27, 2014-Jul. 2, 2014, pp. 16-23, Conference Location: Anchorage, AK, Abstract Only.

* cited by examiner

HIGH PERFORMANCE AND SCALABLE TELEMATICS MESSAGE DISPATCHING

FIELD

The present application relates generally to computers and computer applications, and more particularly to computer-implemented message dispatching of spatial messages.

BACKGROUND

Mobile devices are currently generating mobile (spatio-temporal) data streams at a high-rate for sending to backend servers in real time. Especially with the rise of sensor technology, there are a plethora of mobile devices generating such high-rate mobile data streams. While the mobile data streams are critical sources of mobility analytics supporting advanced mobile services, they also raise new challenges of parallel processing for trajectory-featured data streams.

A dispatching service is a component that supports real-time message processing. With e-partitioned areas and zones, a dispatching service can enable high quality dispatching of mobile data messages according to the geo-partition information from a partition service. In location based message dispatching, longitude and latitude information of message is generally used.

Internet Protocol based dispatching may not be feasible for message dispatching high speed movement objects. For instance, a technique that dispatches by region shape may involve computation of complex relationships between longitude and latitude. Geometry computation can be costly, and in the presence of large clusters of nodes, the dispatching by region shape may become very inefficient. A movement context switch also may pose challenges. For instance, when a moving object moves toward a boundary and prepares to cross the boundary, many application scenario may exist that require switching context to prepare for roaming such as key switch, register information switch, context table switch and refresh, all of which information may generate additional burden for computation and dispatch in an attempt for understanding the distance between the moving object and the boundary. Such factors in dispatching messages from and to moving objects contribute to bottleneck in the overall communication and/or messaging system.

BRIEF SUMMARY

A computer-implemented method and system of dispatching messages in a moving object may be provided. The method, in one aspect, may include receiving a description of a spatial area. The method may also include generating a hierarchical tree representation of the spatial area, the hierarchical tree representation comprising nodes, wherein a child node represents a sub-region of a region represented by a parent node of the child node. The method may also include determining moving features associated with a node, the moving features comprising whether the node is cacheable, whether the node covers an unpartitioned area, an active object list in an area covered by the node, and a latest position associated with an object in the active object list. The method may also include dispatching data associated with the moving object based on the hierarchical tree representation, the dispatching comprising at least one of caching context information associated with the moving object and context switching the context information associated with the moving object from a current region server to another region server.

A system for dispatching messages in a moving object, in one aspect, may include one or more hardware processors operable to receive a description of a spatial area. One or more of the hardware processors may be further operable to generate a hierarchical tree representation of the spatial area, the hierarchical tree representation comprising nodes, wherein a child node represents a sub-region of a region represented by a parent node of the child node. A cache memory may be coupled to one or more of the hardware processors. One or more of the hardware processors may be further operable to store the hierarchical tree representation in the cache memory. One or more of the hardware processors may be further operable to determine moving features associated with a node, the moving features comprising whether the node is cacheable, whether the node covers an unpartitioned area, an active object list in an area covered by the node, and a latest position associated with an object in the active object list. One or more of the hardware processors may be further operable to dispatch data associated with the moving object based on the hierarchical tree representation, the dispatching comprising at one or more of caching context information associated with the moving object or context switching the context information associated with the moving object from a current region server to another region server.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
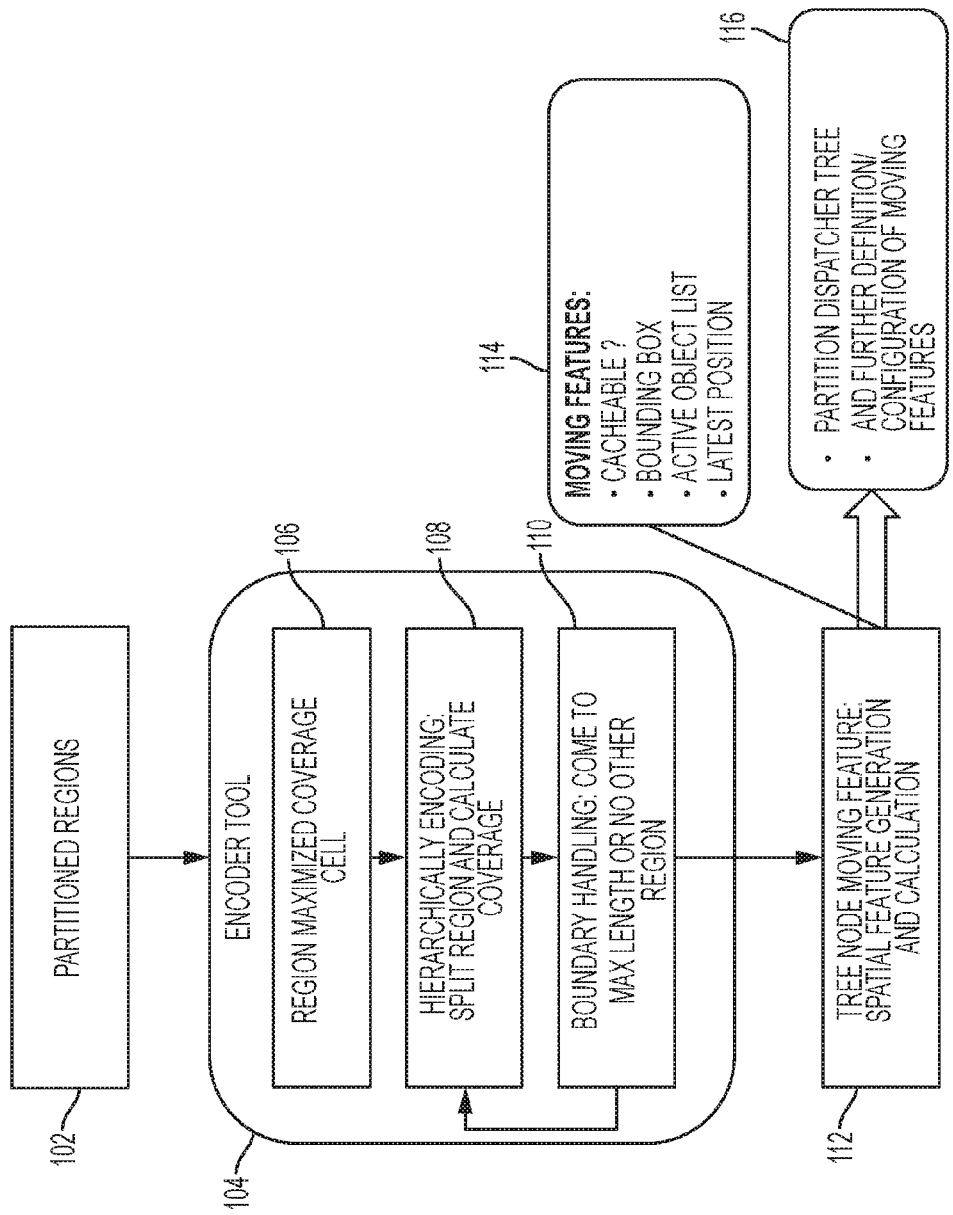
FIG. 1 is a diagram illustrating a hierarchical spatial area encoding method in one embodiment of the present disclosure.

In one embodiment of the present disclosure, a messaging partition technique may be presented that may support highly scalable cloud services, and which a dispatching service system can integrate, for example, to support system load balancing. Such dispatching service system may help in reducing or eliminating bottlenecks in a messaging system. In one embodiment, a distribution or dispatching service may be provided that may implement accurate message distribution and further provide improvements to connected vehicle (via messaging and/or communications) and mobile data management. For instance, the methodology of the present disclosure in one embodiment may improve geographic message dispatching throughput. The methodology of the present disclosure in one embodiment may also address dispatching issues of spatial messages.

In one embodiment of the present disclosure, a geographic area or a spatial area may be encoded hierarchically. In one embodiment, such encoding may be performed offline. A hierarchical spatial area encoder or encoding methodology in one embodiment of the present disclosure may represent the region (geographical area) hierarchically. In one embodiment, the offline aspect of the spatial area encoder in one embodiment of the present disclosure allows the dispatching function becoming a prefix tree match, rather than a heavy geometry calculation. In one embodiment, the hierarchical representation of a region defines and keeps spatial features of the region for dispatching usage purpose.

In one aspect, a method, system and/or techniques of the present disclosure may provide a high performance and scalable telematics message dispatching. In one embodiment, a moving object's spatial movement feature may be taken into consideration when partitioning the spatial area (geographic region) into the nodes of the tree structure. The spatial area may be encoded as a tree structure with stable moving features embedded in the nodes of the tree structure. In one embodiment of the present disclosure, a stable moving feature is a valued added feature. For instance, when a vehicle moves into a region or area that is relatively large in size with a relatively slow speed such that the vehicle would not be able to move out of the region in a given length of time, the vehicle is considered to be stable in that region or area. Examples of a stable moving feature may include whether cacheable, bounding box, active object list, and latest position of the vehicle. This type of information is embedded into the nodes of the tree, which may be updated. Such tree structure may support very high performance massive moving object data distribution. In one embodiment, a hierarchically encoded tree based approach may be utilized for geographical space (geo-space) description or definition for dispatching (e.g., of wireless messages or data). The hierarchical tree in one embodiment, which stores spatial region's moving feature (also referred to as stable moving feature) into nodes, supports cache enabled online dispatching of messages or data from moving objects (e.g., vehicles). In one aspect, the moving feature describes two aspects of a node (area represented by a node): static aspect such as the region's size (bounding box), whether the region may be used as a cache node (e.g., if the size of an area represented by the node is less than a given or threshold size, the node is not used as a cache node); dynamic aspect such as the object (e.g., vehicle) in the area represented by the node and the object's latest position.

In one embodiment, the dispatching process may include prefix-based node identification and region identification, and region spatial information/context storage in cache or switch to next neighbor region depending on a tree node type. For instance, location based dispatching in one embodiment of the present disclosure may utilize geohash, a latitude/longitude geocode system for expressing a location. An encoded code includes a number of characters or bits (code length). The location points that share common prefix code (e.g., a number of prefix characters) may be determined to be in proximity of one another. The longer the prefix code matches occur, the closer the locations. A methodology of the present disclosure in one embodiment may leverage the hierarchical feature of geohash code by proposing a geohash tree based dispatching algorithm.

The methodology of the present disclosure in one embodiment may provide for more efficient dispatching of messages or data from and/or to a moving object. Encoding a region into a hierarchical tree representation and hierarchical-based dispatching, in one aspect, would not be impacted by complexity of spatial region shape, and therefore, allows for easy adaption and easy scaling in location based services (LBS).

In one embodiment, the region spatial feature may be kept or stored as context information in a dispatching server in a memory device, e.g., a cache memory (e.g., fast access memory device), which allows for easy coordination of system context switch as the moving objet switches context. Allowing for easier or faster context switch in moving objects is considered one of important factors in complex mobility services. For instance, a moving vehicle may have its running context such as passing road segments, reading of fuel consumption in past 5 minute window (or another time window), and others. Such information may be utilized for computation or service purpose. When the vehicle switches from one region server to another region server, such information or data may be moved or switched from one region server to another region also. Thus, for example, when a vehicle is in transit between region servers, the context information associated with the vehicle is also in transit. Such context information and vehicle or moving object information may be stored as cache in memory device.

Moving object's data dispatching may be considered differently from the traditional distribution of messages or data, in that moving object's data dispatching may consider spatial feature and moving trends. For example, the spatial feature requires the message distribution to consider boundary calculation; Moving trends require the data context transfer along with a moving object. In an application scenario, a moving object should keep status and context information (map matching; driving behavior analysis; notification). For instance, an application scenario may need a context switch. An example of such application may be an application that performs a driving behavior analysis. If the application is determining the condition of the driver (e.g., whether the driver is tired), data associated with the vehicle needed for such analysis should span not only the current moment, but also the past period of time, e.g., past 5 or 10 minutes. Hence, the information or data should be in transit also. A messaging dispatch technique in one embodiment of the present disclosure prepares and performs context switch when a moving object switch occurs from one node to another node in a tree. In one embodiment of the present disclosure, a node may be covered, managed or handled by a machine (e.g., a region server). Thus, the messaging dispatch technique in one embodiment may switch the context information or data from one machine (region server) to another machine (region server).

In the present disclosure in one embodiment a region's moving feature encoded in a hierarchical data structure is kept stable until the moving object encounters a boundary. In one aspect, the object crossing the boundary may be rare compared with other activities, for instance, because a node that covers a boundary between partitioned regions may cover less area than a node that covers non-boundary area.

The approach in one embodiment of the present disclosure may keep the performance of a dispatching system relatively stable even in the event the spatial area increases in size and/or becomes more complex. For instance, the pre-encoded area information defined in a hierarchical tree structure allows the performance to stay at a stable level despite such changes in the spatial area. In one aspect, the boundary determination in the present disclosure is speed related. For instance, the higher the speed of the vehicle, the more the possibility that the vehicle is close to the boundary, considering the running distance from the current position to the boundary. Further, as described above, the dispatching of the present disclosure that integrates the encoded tree structure supports context roaming or context switching.

FIG. 1 is a diagram illustrating a hierarchical spatial area encoding method in one embodiment of the present disclosure. A tree structure is generated that represents a geographic region or a spatial area, comprising nodes connected in hierarchical manner. The encoding or generating of the tree nodes may be performed off-line at least in part in one embodiment of the present disclosure.

Figure 3:
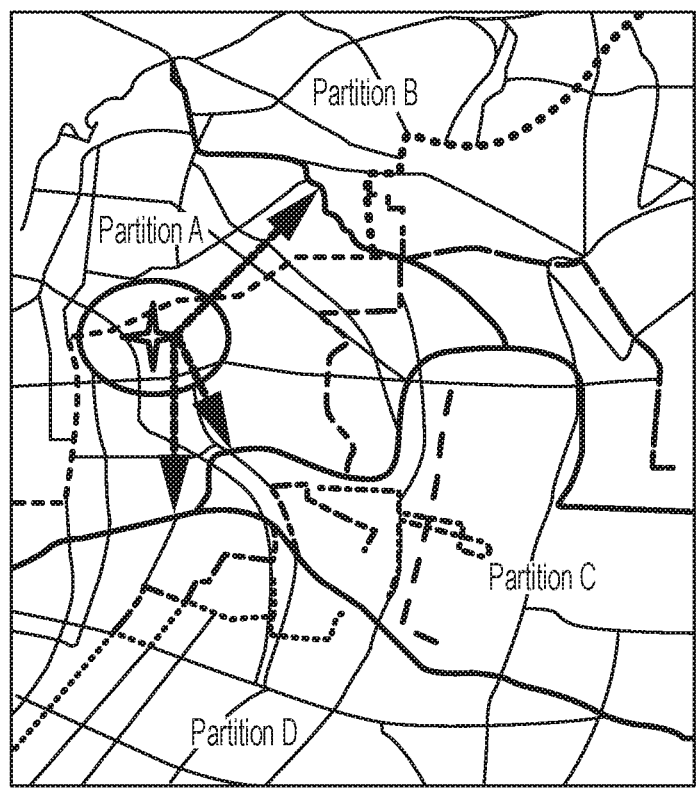
FIG. 3 is another example of a geographic region that may be partitioned into sub-regions in one embodiment of the present disclosure.

At 102, partitioned regions may be received. FIG. 3 shows an example of a partitioned region. The example shows a geographic area partitioned into Partition A, Partition B, Partition C and Partition D. The area, for example, may have been partitioned previously, for example, by a third party (e.g., government or like institution, enterprise), for example, based on one or more criteria. As an example, the computer-implemented format of the partition may be described as a geometric shape, for example, in a geographic information system (GIS) system by MapInfo interchange format (MIF) file or shape file. The partition format may be described in any other manner.

An encoder tool 104 in one embodiment of the present disclosure may perform the functionalities shown at 106, 108 and 110. The encoder tool 104, e.g., may be implemented to run on one or more hardware processors.

At 106, a region is maximized for a coverage cell. In one aspect, the tree's feature may keep the region's whole part as large as possible. In one aspect, the encoding in one embodiment of the present disclosure may try to first encode an area with shorter length that can be covered by the partition. For instance, an area with shorter length that can be covered by the region may be encoded first.

Figures 2A, 2B:
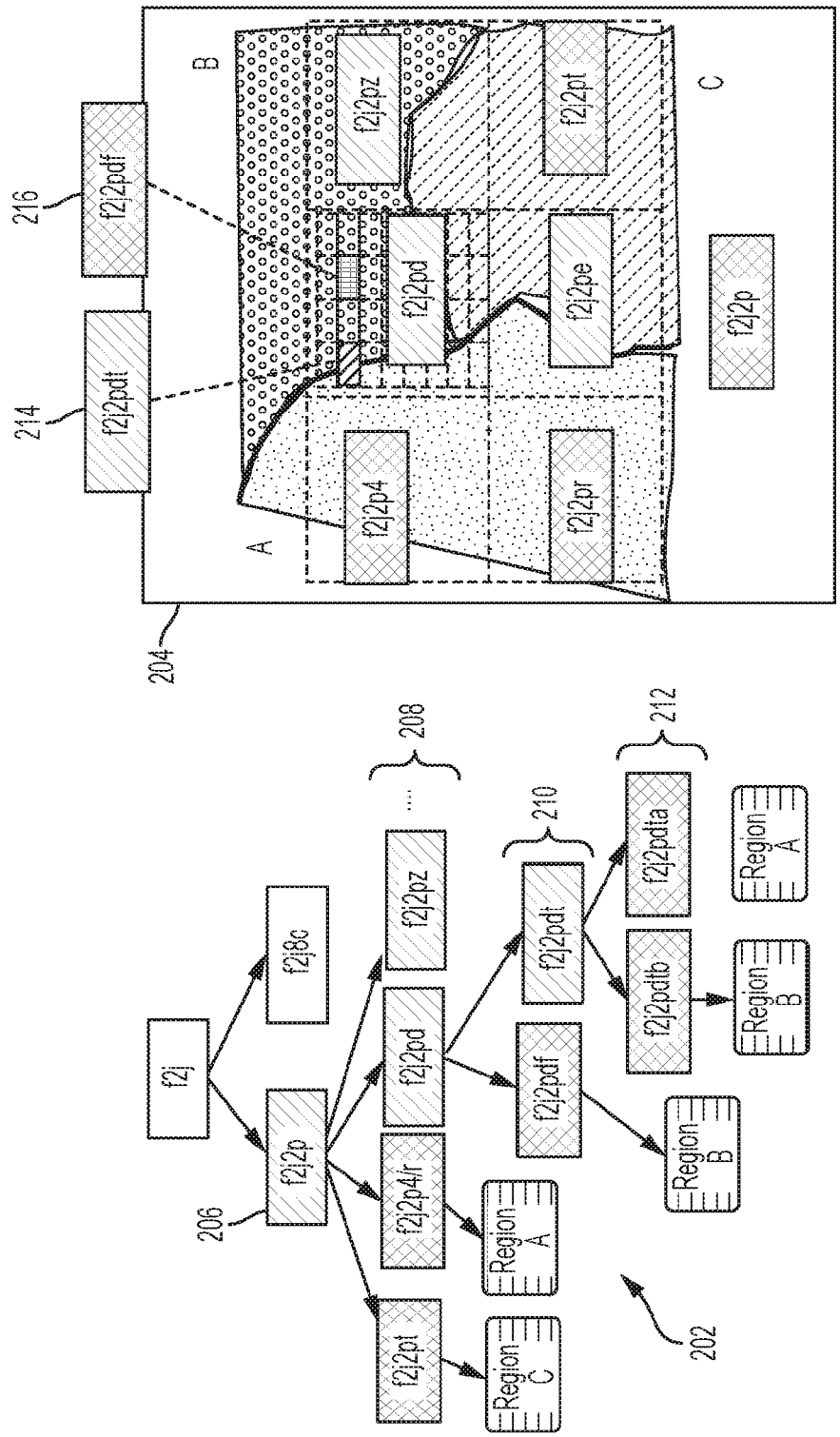
FIG. 2A illustrates an example dispatcher tree generated according to a method of the present disclosure in one embodiment.
FIG. 2B illustrates an example region, for example, which may be may be transformed into a hierarchical tree structure in one embodiment of the present disclosure.

At 108, a hierarchical encoding is performed. For example, the hierarchical encoding may include splitting the region and calculating the coverage for the region. The hierarchical encoding encodes a hierarchical tree. As an example, the center of the partitions may use an x-length grid cell for coverage. At the boundary, that x-length grid cell may be too large to cover a region (e.g., at the boundary the grid cell may cover more than 1 partition), and therefore, the x-length grid cell may be split into smaller cells. FIG. 2B illustrates this example. While an example cell 'f2j2p4' can be used to cover an area of partition A, the cell grid 'f2j2pd' is split into smaller cells (e.g., 32 smaller cells).

The hierarchical encoding in one embodiment may utilize geohash coding. An algorithm for the hierarchical encoding in one embodiment hierarchically traverses the geohash space to build a tree, and terminates only when one geohash area can be included in one partition area or a maximal precision requirement is met. In one embodiment, the methodology of the present disclosure may first explore and generate an initial geohash code as root. In one embodiment, the root code is the one which covers the whole space and any one of directly succeeding children cannot cover the space. FIGS. 2A and 2B illustrates an example of building a hierarchical tree. The region may be split into grid cells and represented by a node labeled 'f2j2p', e.g., shown at 206. Child nodes of the node at 206 may be generated to include the split regions (e.g., 'f2j2p4', 'f2j2pr', 'f2j2pd', 'f2j2pe', 'f2j2pz' and 'f2j2pt' shown for example at 208. The split regions 'f2j2p4', 'f2j2pr', and 'f2j2pt', each cover one partition area, and therefore, may be generated to be or designated as a leaf node with partition (region ID) the node covers. For example, 'f2j2pt' is a leaf node with corresponding region ID of Region C (Partition C), 'f2j2p4' and 'f2j2pr' are leaf nodes with corresponding region IDs of Region A (Partition A), and so on. Those nodes which cross multiple areas, e.g., f2j2pd, f2j2ppe and f2j2pz in FIG. 2B, are further divided. Consider the node labeled f2j2pd as a specific example. After division, the algorithm determines that one or more of its children node can be designated as a leaf node, e.g., node f2j2pdf with Region B (Partition or Area B) as a correlated region. One or more other nodes, e.g., f2j2pdt, may be further divided. The division of the area to be represented by a node may continue, until that node covers one area (partition) or a maximal precision requirement is met (e.g., the area cannot be further divided based on a threshold size or length). The smallest division is designated as a leaf node with a corresponding area or partition that it covers. If a smallest division covers more than one partition, e.g., because it met the maximal precision requirement even though it covers multiple partitions, a plurality corresponding areas or partitions may be associated with a node that represents that area (division).

At 110, boundary handling is performed. For example, if maximum length is encountered or if there are no other regions, a node may be generated to cover this region and defined as a leaf node. For instance, if the split region is encoded with a threshold length, e.g., 6 character code length of encoding, the encoding may be considered fine enough and no further splitting may be performed, and a tree node may be generated and encoded for this region. The tree node may be designated as a leaf node with corresponding region which it covers.

At 112, for each node in the tree, moving feature is generated. For example, spatial feature for each node may be generated and calculated. For instance, the size of the cell or region is calculated or determined. Based on the size, it is decided whether the cell or the node representing this cell is large enough to be used as a cacheable node. For example, a node may cache a moving object's (e.g., vehicle's) context if the region represented by the node is considered large enough. Whether the size is large enough may be based on a threshold value which may have been predetermined or preconfigured. Consider for example, if the moving object (e.g., vehicle) is located substantially in the center area of the region represented by the node and considering the speed of the moving object (e.g., vehicle), the region is large enough that it would take a predetermined length of time (e.g., minutes) to reach a boundary area of the region (cell) represented by the node, the node may be determined to be cacheable. Examples of moving features, e.g., as shown at 114, may include, but are not limited to, whether the information of the node is cacheable and, whether the node is a bounding box. Bounding box is an area (e.g., rectangle) that envelopes a region. A moving feature may also include an active object list, e.g., which moving objects are currently in the region represented by the node. A moving feature may also include the latest position of the objects (e.g., vehicles)

in that area. Those moving features (e.g., active object list and the latest positions) may be determined on-line, for example, based on receiving current data or location points of moving objects.

The method shown in FIG. 1, e.g., generates a partitioned dispatcher tree defining configuration of moving features as shown at 116.

FIG. 2A illustrates an example dispatcher tree generated according to a method of the present disclosure in one embodiment. The tree 202 is a hierarchically encoded structure that represents a region, e.g., shown in FIG. 2B. FIG. 2B illustrates an example region, for example, which may be received at 102 in FIG. 1, as input to build the tree 202. A node in a tree (e.g., 206) may be created that corresponds to the region (e.g., labeled f2j2p) 204. Child nodes 208 to the node 206 may be created that correspond to the sub-regions or partitions of the region shown in FIG. 2B (e.g., shown as dashed rectangles). In turn, child nodes 210 to the nodes at 208 are created that represent further sub-regions or partitions of the sub-region, e.g., nodes at 210 corresponding to the sub-regions at 214 and 216. Further child nodes (e.g., 212) may be created to correspond to further partitions or sub-regions. In this way, a region may be represented hierarchically via a tree of nodes. A parent node represents a region and a child node represents a section of that region. In one aspect, the sub-division or splitting of a region occurs until a split region covers entirely one partition area, or a code that represents the split region meets a criterion such as the maximum encoding length.

FIG. 3 is an example of a geographic region partitioned into areas. A description of such region may be received at 102 in FIG. 1, as input to build the tree 202. Mobile devices or moving objects having communication capabilities may be moving around or through that geographic region. The methodology of the present disclosure in one embodiment builds a hierarchical tree nodes or structure that represent the region, which may be integrated with a dispatching service that dispatches messages to and from those mobile devices or moving objects.

In one embodiment of the present disclosure, an offline encoder, for example, which builds the hierarchical tree of nodes representing a region, may be integrated as a tool with a graphical user interface, for example, on a cloud computing system, for a user to load partition area definitions and/or configurations of moving features.

Figure 4:
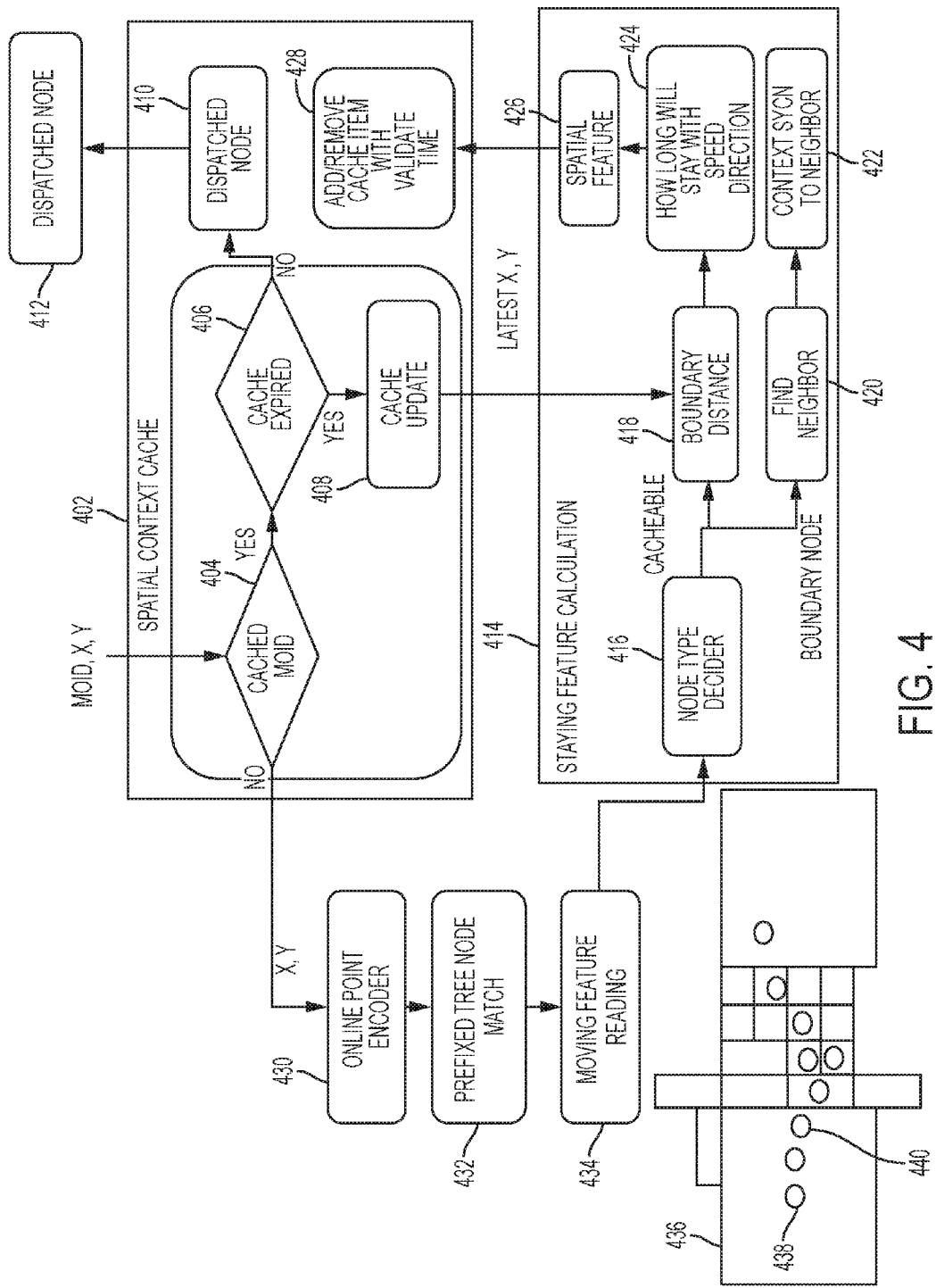
FIG. 4 is a diagram illustrating a method of spatial feature based cache enabled dispatching in one embodiment of the present disclosure.

FIG. 4 is a diagram illustrating a method of spatial feature based cache enabled dispatching in one embodiment of the present disclosure. The dispatching method, for example, may be performed online, referencing or utilizing a hierarchical tree structure representing a region and encoded with spatial area features, for example, which may be been pre-built. The method may include tree-based matching, for example, of prefix code associated with the current location (longitude and latitude points represented by x, y) with a prefix code associated with a node of the tree, and calculating a spatial feature (e.g., how long it would take for a moving object to move from the current position to the boundary of the encoding cell or node. The method may also include caching the context and/or switching the context between region servers. A cache memory or storage may cache the context information associated with the moving objects based on criteria.

The method in one embodiment of the present disclosure, for example, reduces the need to calculate and match a moving object's (e.g., vehicle's) position points every time that moving object uploads its position to a server. For instance, consider a vehicle that is uploading its position every 1 second. If the vehicle is determined to be in the center part (or substantially center part) of the cell, the method may directly dispatch the information associated with the vehicle to the region server, not every time the vehicle uploads its position (e.g., not every second), but only periodically, for example, once within the next 10 minutes, for instance, since it would have been determined that the vehicle will not be moving out of the region represented by the node within that amount of time. For instance, there may not be a need to dispatch the location points of the vehicle to another node in the following 10 minutes given that the vehicle cannot be moving out of the current node or region represented by the node (e.g., determined based on the current location of the vehicle, the size of the region represented by the node, and the current speed of the vehicle). By doing so, the method would have 10*60=600 position points of the vehicle that is not dispatched, resulting in cost savings in throughput and computing resources. After the period of time, for example, after the 10 minute, the method may calculate again, to determine whether the vehicle would move to a boundary, whether the vehicle would move to a more centered position. For instance, it may be determined that the vehicle may stay in the region represented by the node within following 20 minutes. In that scenario, the method would have save dispatching of next 20*60=1200 position points. As another example, if the method finds that the current position point indicates that the vehicle can move to a boundary within 5 minute, the method may save 300 points from dispatching. Still yet as another example, if the method finds that the vehicle is close to a boundary (e.g., based on the current position and speed of the vehicle, it is determined that the vehicle can reach a boundary of the region represented by the node in 3 minutes), the method may calculate the points and prepare to switch the context information to another node (referred to as roaming).

The block shown at 402 performs spatial context caching. For example, context information associated with a moving object (e.g., a vehicle) moving in a region may be cached, e.g., saved or stored as cache, e.g., based on determining whether the node representing the region (a spatial area) is cacheable. At 404, moid x, y may be received and determined whether the moid is cached. For example, it is determined whether the position points x and y (e.g., longitude and latitude points) have associated cached information, for example, and associated with a node of a hierarchical spatial tree.

Cache, for example, refers to a memory device used to store the hierarchical representation of a region. The memory device used for cache may be one or more of a fast access memory or another storage device. In one aspect, context information and spatial features associated with a node may be cached or stored in a memory device. In one aspect, the hierarchical tree representing a region may be stored in a hard disk or like storage device and also may be downloaded to a faster cache memory. The methodology of the present disclosure in one embodiment generates the cache and maintains the cache with spatial features and/or context information associated with the nodes of the tree.

If the moid is determined to be cached, at 406, it is determined whether the cache has expired. Cache may expire, for example, if a vehicle is determined to be moving out or moved out of a node. For instance, if a vehicle is determined to be moving out of a node in 5 minutes, the cache storing context information associated with that vehicle may expire in 5 minutes. The current time and the length of stay with speed direction calculated and stored in the cache at a previous time may be compared to determine whether the cache expired.

If at 406, it is determined that cache has expired, at 408, the cache is updated with the received moid x y and current context information (e.g., that may include the current spatial features), for example, by proceeding to 418.

If at 406, it is determined that cache has not expired, the current node would keep the dispatch information associated with the vehicle at 410, and 412. For example, there may be no need to dispatch to another node. The cache is kept to contain the context information associated with the vehicle.

If at 404 it is determined that the moid is not cached, online point encoder encodes the received x and y point at 430. For example, the x-y longitude and latitude points may be encoded into a prefix code used in geohash for comparing with the prefix code associated with the nodes of the hierarchical spatial tree.

At 432, prefixed tree node matching is performed. For example, a prefix code based tree traversal and prefix matching (e.g., string matching) may be performed. For instance, for the MOID x, y, responsive to receiving an inbounding point, for example, moid x, y, a pre-built space division geohash tree may be utilized to determine dispatching nodes, for instance, by calculating a geohash code with a given length and traversing the tree based on the code. The initial length of code may be optimized based on geohash tree's structure and the length pair. When geocode is calculated for incoming points, the method in one embodiment of the present disclosure may use a prefix to explore the tree until a leaf node is encountered. If it is determined that the initial length is not long enough to traverse the tree, the traversal may be suspended while the geohash code is regenerated to have longer length. Once regenerated, the tree traversal may resume with the regenerated code, searching for a node that has the code that matches the regenerated code. At 434, moving feature reading is performed. For instance, the moving features associated with the matched node is read or retrieved. Additional moving features may be generated for this node based on the current position of the moving object (e.g., the received x, y position).

The reference item shown at 436 illustrates a switching example. A switch may be defined by region size and current point position. As an example, consider that the first point (shown at 438) occurs in the middle of the region in the left grid cell. That first point would not switch to other region (another grid cell) readily since the region is relatively large. In this case, no calculation is performed and the point is dispatched to the region server without any tree traversal. Consider, however, the location point is at the boundary area of that grid cell, e.g., shown at 440. In that scenario, the methodology of the present disclosure considers a switch to other nodes (another grid cell represented by a node of the hierarchical tree). In one aspect, using a technique such as a prefix code matching of the current point with a node's prefix code, it may be determined whether the point is well within the center of the grid cell or at the boundary. For instance, in encoding the hierarchical tree, a geohash-like encoding encodes the longitude and latitude to prefix code of incoming points. The methodology of the present disclosure also encodes the space into a tree to include a prefix code associated with the region covered by each node of the tree.

The block shown at 414 performs a staying feature calculation. At 416, based on the moving feature reading, node type may be decided. Node type indicates whether the node is cacheable or not cacheable.

At 418, for a cacheable node, boundary distance may be determined. For instance, the distance from the x, y position to a boundary of the node may be determined.

At 424, a length of time may be determined as to how long a moving object may stay in the region (or sub-region) represented by this node.

At 420, a neighbor node is searched for and identified in the tree structure, for instance, based on determining that the current x, y position is at or near a boundary point of the node.

At 424, the context of the node is synchronized with the neighbor node, for instance, based on determining that the current x, y position is at or near a boundary point of the node.

At 426, spatial feature is determined based on the current x, y position and the node that encodes information about this feature.

At 428, cache item may be added or removed with validated time. The cache item, for instance, stores the currently determined spatial feature (e.g., at 426).

Figure 5:
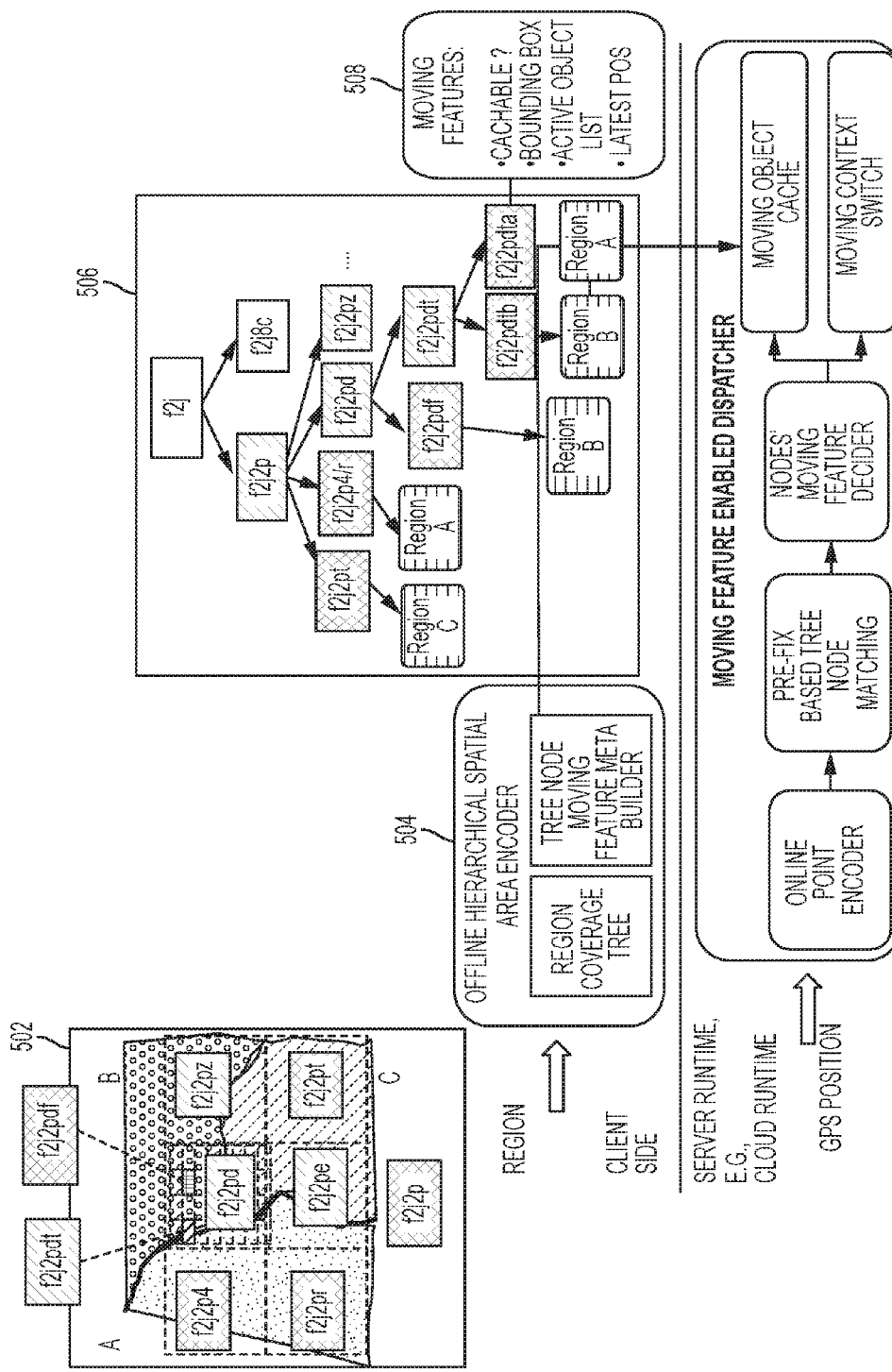
FIG. 5 is a diagram illustrating an overview of a spatial area encoder and moving feature enabled dispatcher in one embodiment of the present disclosure.

FIG. 5 is a diagram illustrating an overview of a spatial area encoder and moving feature enabled dispatcher in one embodiment of the present disclosure. A description or image of a region 502 may be received. The region 502 may be partitioned. A hierarchical spatial area encoder (e.g., offline) 504 may build a structured tree comprising nodes that represent the region and its partitioned regions, in a hierarchical manner. A tree node moving feature meta builder of the encoder may determine and define moving features associated with each node. An example tree is shown at 506. As shown at 508, a node (e.g., each node) may have moving features such as whether the node is cacheable, whether the node is a bounding box, active object list of the node, the latest position of the objects in the area represented by the node.

In one embodiment of the present disclosure, the hierarchical spatial area encoder may run on a client device and/or a server side. For instance, the encoder may run first offline to encode the region into a tree structure. The encoder may also run against every point of moving object. The encoder, for example, may run at a server side receiving, for example, the incoming points from a moving object.

A moving feature enabled dispatcher 510 of the present disclosure in one embodiment may run on a server machine, for example, on a system enabled to perform cloud computing.

The moving feature enabled dispatcher 510 may receive a Global Positioning System (GPS) position or the like from a moving object such as a vehicle that includes a GPS or like positioning or location capability, as an input. An online point encoder of the moving feature enabled dispatcher 510 may encode the GPS position, for example, into a prefix code or another code consistent with the encoding of the nodes of the tree. The moving feature enabled dispatcher 510 performs a prefix based tree node matching using the hierarchical tree.

The moving feature enabled dispatcher 510 may determine the nodes' moving features.

Based on the moving feature determined, moving object cache or moving context switch between region servers may be performed.

Figure 6:
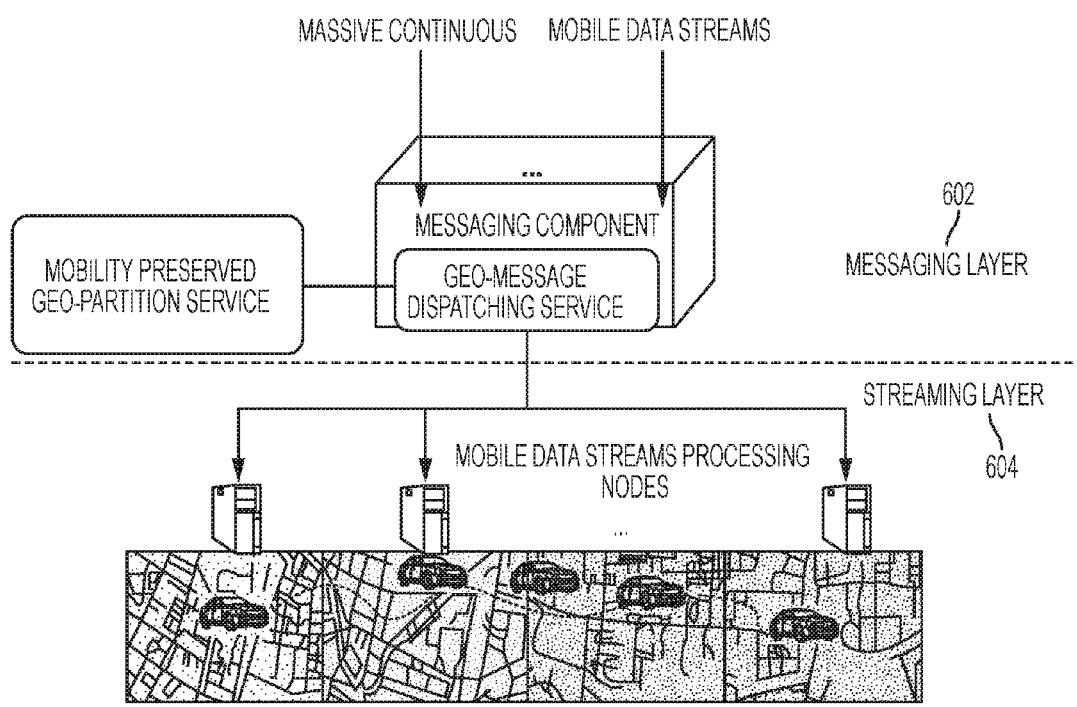
FIG. 6 shows an architectural diagram of message dispatching system for mobile devices in one embodiment of the present disclosure.

FIG. 6 shows an architectural diagram of message dispatching system for mobile devices in one embodiment of the present disclosure. A messaging layer 602 in one aspect may perform mobility preserved geo-partition service based on continuous mobile data streams received by a messaging component. A streaming layer 604 streams processing nodes. For example, data from and to a moving vehicle may be dispatched to location or region servers based on the current location of the moving vehicle.

For example, as described above, the methodology of the present disclosure in one embodiment encodes a spatial area as a tree structure with stable moving features embedded in the nodes of the tree, for instance, to achieve very high performance massive moving object data dispatching in connected vehicle domain. In one embodiment, a dispatching tree with spatial feature, e.g., embedded on the leaf of the tree, to support a cache, may support the high performance dispatching and avoid re-calculation of each point.

Figure 7:
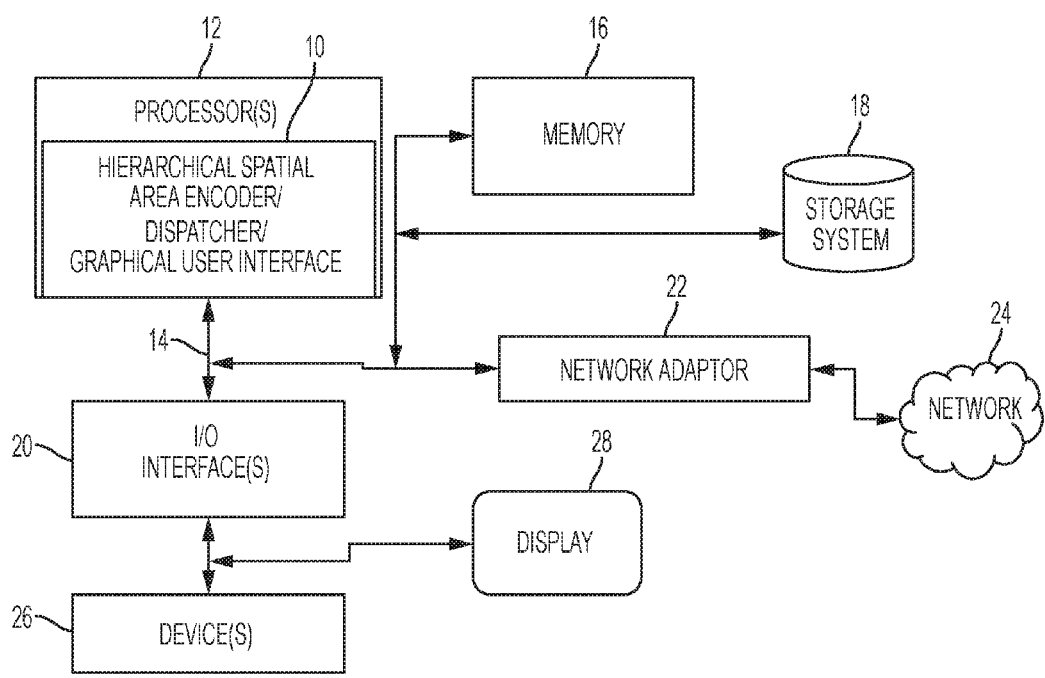
FIG. 7 illustrates a schematic of an example computer or processing system that may implement a spatial area encoder and dispatching system in one embodiment of the present disclosure.

FIG. 7 illustrates a schematic of an example computer or processing system that may implement a spatial area encoder and dispatching system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a spatial area encoder and/or dispatching module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of dispatching messages in a moving object, the method executed on one or more processors, comprising:
receiving a description of a spatial area;

generating a hierarchical tree representation of the spatial area, the hierarchical tree representation comprising nodes that represent sub-regions of the spatial area encoded hierarchically;

determining moving features associated with a node, the moving features comprising whether the node is cacheable wherein the node is defined to be cacheable if a sub-region of the spatial area represented by the node covers an area greater than a threshold size, whether the node covers more than one partition areas among multiple pre-partitioned areas, an active object list in an area covered by the node, and a latest position associated with an object in the active object list; and dispatching data associated with the moving object based on the hierarchical tree representation, the dispatching comprising at least one of caching context information associated with the moving object and context switching the context information associated with the moving object from a current region server to another region server.

2. The method of claim 1, wherein the spatial area is partitioned into a plurality of partitions.

3. The method of claim 1, wherein the dispatching data from the moving object based on the hierarchical tree representation comprises:

receiving a GPS position of the moving object;

matching the GPS position to a node in the hierarchical tree representation;

determining the moving features of the node;

based on the moving features of the node, performing one or more of caching context information associated with the moving object and context switching the context information associated with the moving object from a current region server to another region server.

4. The method of claim 1, wherein the dispatching data from the moving object based on the hierarchical tree representation comprises:

receiving a GPS position of the moving object;

determining whether the GPS position is cached with associated context information;

responsive to determining that the GPS position is cached, determining whether the cached context information has expired;

responsive to determining that the cached context information has not expired, waiting before performing another dispatching.

5. The method of claim 4, wherein responsive to determining that the cached context information has expired, updating the cached context information based on the moving features.

6. The method of claim 1, wherein the moving object comprises a vehicle.

7. The method of claim 1, wherein the hierarchical tree representation is stored in a memory device.

8. A non-transitory computer readable storage medium storing a program of instructions executable by a machine to perform a method of dispatching messages in a moving object, the method comprising:

receiving a description of a spatial area;

generating a hierarchical tree representation of the spatial area, the hierarchical tree representation comprising nodes that represent sub-regions of the spatial area encoded hierarchically;

determining moving features associated with a node, the moving features comprising whether the node is cacheable wherein the node is defined to be cacheable if a sub-region of the spatial area represented by the node covers an area greater than a threshold size, whether the node covers more than one partition areas among multiple pre-partitioned areas, an active object list in an area covered by the node, and a latest position associated with an object in the active object list; and dispatching data associated with the moving object based on the hierarchical tree representation, the dispatching comprising at least one of caching context information associated with the moving object and context switching the context information associated with the moving object from a current region server to another region server.

9. The non-transitory computer readable storage medium of claim 8, wherein the spatial area is partitioned into a plurality of partitions.

10. The non-transitory computer readable storage medium of claim 8, wherein the dispatching data from the moving object based on the hierarchical tree representation comprises:

receiving a GPS position of the moving object;

matching the GPS position to a node in the hierarchical tree representation;

determining the moving features of the node;

based on the moving features of the node, performing one or more of caching context information associated with the moving object and context switching the context information associated with the moving object from a current region server to another region server.

11. The non-transitory computer readable storage medium of claim 8, wherein the dispatching data from the moving object based on the hierarchical tree representation comprises:

receiving a GPS position of the moving object;

determining whether the GPS position is cached with associated context information;

responsive to determining that the GPS position is cached, determining whether the cached context information has expired;

responsive to determining that the cached context information has not expired, waiting before performing another dispatching.

12. The non-transitory computer readable storage medium of claim 11, wherein responsive to determining that the cached context information has expired, updating the cached context information based on the moving features.

13. The non-transitory computer readable storage medium of claim 8, wherein the moving object comprises a vehicle.

14. The non-transitory computer readable storage medium of claim 8, wherein the hierarchical tree representation is stored in a memory device.

15. A system for dispatching messages in a moving object, comprising:

one or more hardware processors operable to receive a description of a spatial area, one or more of the hardware processors further operable to generate a hierarchical tree representation of the spatial area, the hierarchical tree representation comprising nodes that represent sub-regions of the spatial area encoded hierarchically;

a cache memory coupled to one or more of the hardware processors, one or more of the hardware processors further operable to store the hierarchical tree representation in the cache memory;

one or more of the hardware processors further operable to determine moving features associated with a node, the moving features comprising whether the node is cacheable wherein the node is defined to be cacheable if a sub-region of the spatial area represented by the node covers an area greater than a threshold size, whether the node covers more than one partition areas among multiple pre-partitioned areas, an active object list in an area covered by the node, and a latest position associated with an object in the active object list, one or more of the hardware processors further operable to dispatch data associated with the moving object based on the hierarchical tree representation, the dispatching comprising at one or more of caching context information associated with the moving object or context switching the context information associated with the moving object from a current region server to another region server.

16. The system of claim 15, wherein the spatial area is partitioned into a plurality of partitions.

17. The system of claim 15, wherein one or more of the hardware processors dispatch data from the moving object based on the hierarchical tree representation by:
receiving a GPS position of the moving object;
matching the GPS position to a node in the hierarchical tree representation;
determining the moving features of the node;
based on the moving features of the node, performing one or more of caching context information associated with the moving object and context switching the context information associated with the moving object from a current region server to another region server.

18. The system of claim 15, wherein one or more of the hardware processors dispatch data from the moving object based on the hierarchical tree representation by:
receiving a GPS position of the moving object;
determining whether the GPS position is cached with associated context information;
responsive to determining that the GPS position is cached, determining whether the cached context information has expired;
responsive to determining that the cached context information has not expired, waiting before performing another dispatching.

19. The system of claim 18, wherein responsive to determining that the cached context information has expired, updating the cached context information based on the moving features.

20. The system of claim 15, wherein the moving object comprises a vehicle.

\* \* \* \* \*